(12) United States Patent
Kashihara et al.

(10) Patent No.: US 9,899,898 B2
(45) Date of Patent: Feb. 20, 2018

(54) CONTROLLER-INTEGRATED ROTARY ELECTRIC MACHINE

(71) Applicant: Mitsubishi Electric Corporation, Tokyo (JP)

(72) Inventors: Toshiaki Kashihara, Tokyo (JP); Yoshinobu Utsumi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 142 days.

(21) Appl. No.: 14/303,322

(22) Filed: Jun. 12, 2014

(65) Prior Publication Data

US 2015/0229172 A1    Aug. 13, 2015

(30) Foreign Application Priority Data

Feb. 7, 2014    (JP) ................................ 2014-021865

(51) Int. Cl.
| | |
|---|---|
| *H02K 11/00* | (2016.01) |
| *H02K 3/28* | (2006.01) |
| *H02K 11/04* | (2016.01) |
| *H02K 5/22* | (2006.01) |

(52) U.S. Cl.
CPC ............ *H02K 11/048* (2013.01); *H02K 5/225* (2013.01)

(58) Field of Classification Search
CPC ............................. H02K 11/048; H02K 5/225
USPC .............. 310/71, 68 R, 67 R, 68 D; 439/524
See application file for complete search history.

(56) References Cited

U.S. PATENT DOCUMENTS

| | | | | |
|---|---|---|---|---|
| 2002/0047360 A1* | 4/2002 | Kaizu | ..................... | H02K 5/225 310/68 D |
| 2006/0267424 A1* | 11/2006 | Imai | ....................... | H02K 5/225 310/71 |
| 2011/0070771 A1* | 3/2011 | Martauz | ................. | H01R 4/184 439/524 |
| 2013/0154407 A1* | 6/2013 | Isoda | ................... | H02K 11/046 310/52 |

FOREIGN PATENT DOCUMENTS

WO    2012/081068 A1    6/2012

OTHER PUBLICATIONS

English translation of WO 2012081068; Isoda et al., Jun. 2012; Wipo.*

(Continued)

*Primary Examiner* — Bernard Rojas
*Assistant Examiner* — Ahmed Elnakib
(74) *Attorney, Agent, or Firm* — Sughrue Mion, PLLC; Richard C. Turner

(57) ABSTRACT

A controller-integrated rotary electric machine with electrolytic corrosion resistance improved can be obtained. The controller-integrated rotary electric machine includes: a power circuit unit provided between an external power supply and a stator winding of a rotary electric machine main body; a power input/output terminal bolt provided in the power circuit unit and electrically connected to the external power supply; a plate pressed into the power input/output terminal bolt and abutting a power input/output conductor; a bus bar connected to the power input/output conductor; and a power module connected to the bus bar and the stator winding, wherein the power input/output terminal bolt and the bus bar are separated from each other.

10 Claims, 4 Drawing Sheets

(56) References Cited

OTHER PUBLICATIONS

English translation of JP 05-225874; Zenmei Keisaku, Sep. 1993; Japan.*
Communication dated Dec. 16, 2014 from the Japanese Patent Office in counterpart application No. 2014-021865.
Communication dated Oct. 18, 2016 from the French Patent Office in counterpart Application No. 1456399.

* cited by examiner

CONTROLLER-INTEGRATED ROTARY ELECTRIC MACHINE

BACKGROUND OF THE INVENTION

Field of the Invention

The present invention relates to a controller-integrated rotary electric machine in which a rotary electric machine and a controller for controlling the rotary electric machine are integrally configured.

Description of the Related Art

A controller-integrated rotary electric machine mounted on a vehicle, such as a car, includes a power conversion circuit for power conversion between an armature winding of the rotary electric machine and a battery provided outside the rotary electric machine. The power conversion circuit generally includes a plurality of power modules containing a semiconductor based switching device and operates as an inverter or converter under control by a gate signal applied to the gate of these switching devices.

When the rotary electric machine is caused to operate as a motor, the power conversion circuit is caused to operate as an inverter that converts DC power of the battery into AC power to be supplied to the armature winding of the rotary electric machine. On the other hand, when the rotary electric machine is caused to operate as a generator, the power conversion circuit is caused to operate as a converter that converts AC power induced in the armature winding of the rotary electric machine into DC power to be supplied to the battery.

In one controller-integrated rotary electric machine configured as above, between a power input/output terminal of the armature winding of the rotary electric machine and a power input/output terminal that is an AC-side terminal of a power module included in the power conversion circuit, and at a power input/output terminal that is a DC-side terminal of the power module, a bus bar includes one electrical coupling and at least one mechanical coupling other than the electrical coupling, and the bus bar is electrically coupled to a terminal by the one electrical coupling and mechanically coupled to a heat sink or bracket by the at least one mechanical coupling with an insulator in between (for example, see Patent Document 1).

[Patent Document 1] WO 2012/081068

However, the conventional controller-integrated rotary electric machine as described in the Patent Document 1 has a problem that since a power input/output terminal bolt is directly pressed into the bus bar, when salt water or the like penetrates from the outside to the head of the power input/output terminal bolt, the surrounding area of the press fit of the bus bar deteriorates through electrolytic corrosion, and finally, a crack occurs in the surrounding area of the press fit of the bus bar due to engine vibration and then the correct power is no longer supplied to the power module.

Furthermore, another problem is that the bus bar needs a press fit length that provides a mechanical joint surface and also, in view of the above-described problem, needs an unnecessarily large thickness of the bus bar irrespective of heat generation by electricity, leading to upsizing.

SUMMARY OF THE INVENTION

In order to solve the above problem in the conventional rotary electric machines, it is an object of the present invention to provide a controller-integrated rotary electric machine in which electrolytic corrosion resistance is improved generally in the electrical coupling surface between the power input/output terminal bolt and the bus bar, and the power input/output terminal bolt and the bus bar are downsized.

A controller-integrated rotary electric machine in accordance with the invention includes: a power input/output terminal bolt connected to a power circuit unit provided between an external power supply and a stator winding of a rotary electric machine main body; a plate pressed into the power input/output terminal bolt and abutting a power input/output conductor; a bus bar connected to the power input/output conductor; and a power module connected to the bus bar and the stator winding, wherein the power input/output terminal bolt and the bus bar are separated from each other.

According to the controller-integrated rotary electric machine of the invention, electrolytic corrosion resistance can be improved in the electrical coupling surface between the power input/output terminal bolt and the bus bar, and the power input/output terminal bolt and the bus bar can be downsized.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
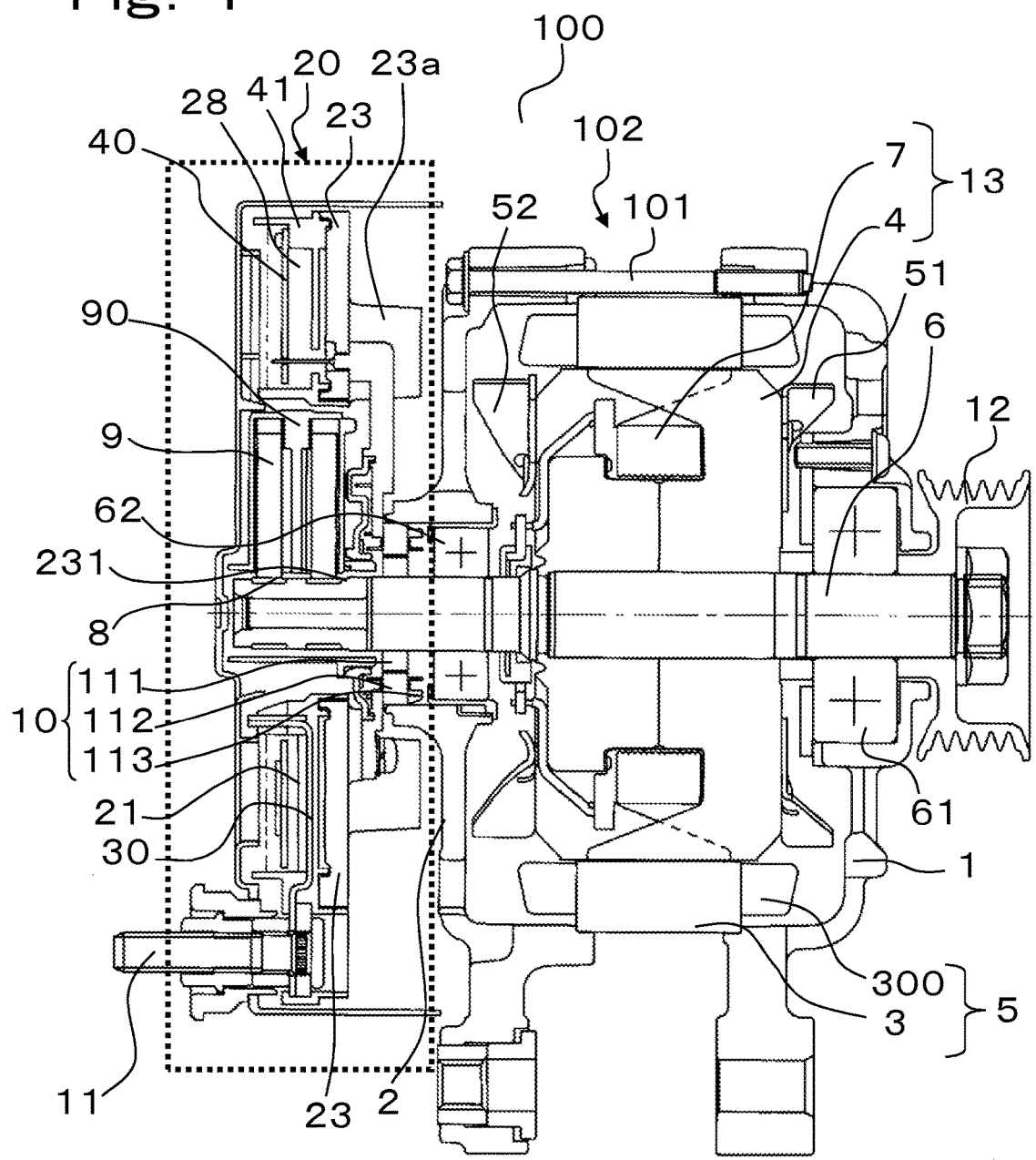
FIG. 1 is a vertical cross-sectional view of a controller-integrated electric generator according to a first embodiment of the invention.

FIG. 1 is a vertical cross-sectional view of a controller-integrated rotary electric machine in accordance with a first embodiment of the invention.

In FIG. 1, a controller-integrated rotary electric machine for vehicle 100 includes: a stator core 3 supported by a front bracket 1 and a rear bracket 2; and a rotor core 4 inserted into the inside space of the stator core 3. The rotor core 4 includes a plurality of rotor poles facing the inner circumference surface of the stator core 3 with an air gap in between.

A stator winding 300 that is an armature winding in which a coil piece is inserted into a slot of the stator core 3 is fixed to the stator core 3. In the first embodiment, the stator winding 300 is six-phase connected. A rotor winding 7 that is a field winding is fixed to the rotor core 4. The stator core 3 and the stator winding 300 form a stator 5 of a rotary electric machine main body 102. The rotor core 4 and the rotor winding 7 form a rotor 13 of the rotary electric machine main body 102.

The front bracket 1 and the rear bracket 2 are tightened in the direction of approaching each other by a plurality of bolts 101 to tightly sandwich the stator core 3.

A rotor shaft 6 passing through the center of the rotor core 4 is rotatably supported by a front bearing 61 supported by the front bracket 1 and a rear bearing 62 supported by the rear bracket 2. A front cooling fan 51 and a rear cooling fan 52 that are fixed to the front end face and the rear end face of the rotor core 4 rotate in conjunction of the rotor core 4 to cause an air to flow from the outside to the inside of the front bracket 1 and the rear bracket 2, respectively, to cool the inside of the rotary electric machine main body 102.

A pulley 12 is fixed to the front end of the rotor shaft 6. A transmission belt (not shown) that works with the rotary shaft of an engine is wound around the pulley 12. A pair of slip rings 8 fixed to the circumferential face of the rotor shaft 6 are in slidable contact with a pair of brushes 9 supported by a brush holder 90.

A pole position detection sensor 10 configured by a synchro resolver includes: a sensor rotor 111 fixed to the rear end of the rotor shaft 6; a sensor stator 112 fixed to the rear bracket 2 facing the sensor rotor 111; and a sensor winding 113 fixed to the sensor stator 112.

A control circuit board 40 including a control circuit is contained in a board housing case 41 made of a resin. The control circuit provided on the control circuit board 40 controls switching operation of a power module 21 described later. The board housing case 41 is fixed to the outer surface of a heat sink 23.

A power circuit unit 20 is fixed outside the rear bracket 2 and includes a power conversion circuit for power conversion between the stator winding 300 that is the armature winding and a battery (not shown). The power conversion circuit includes six power modules 21 described later and operates as a six-phase inverter or six-phase converter.

Figure 3:
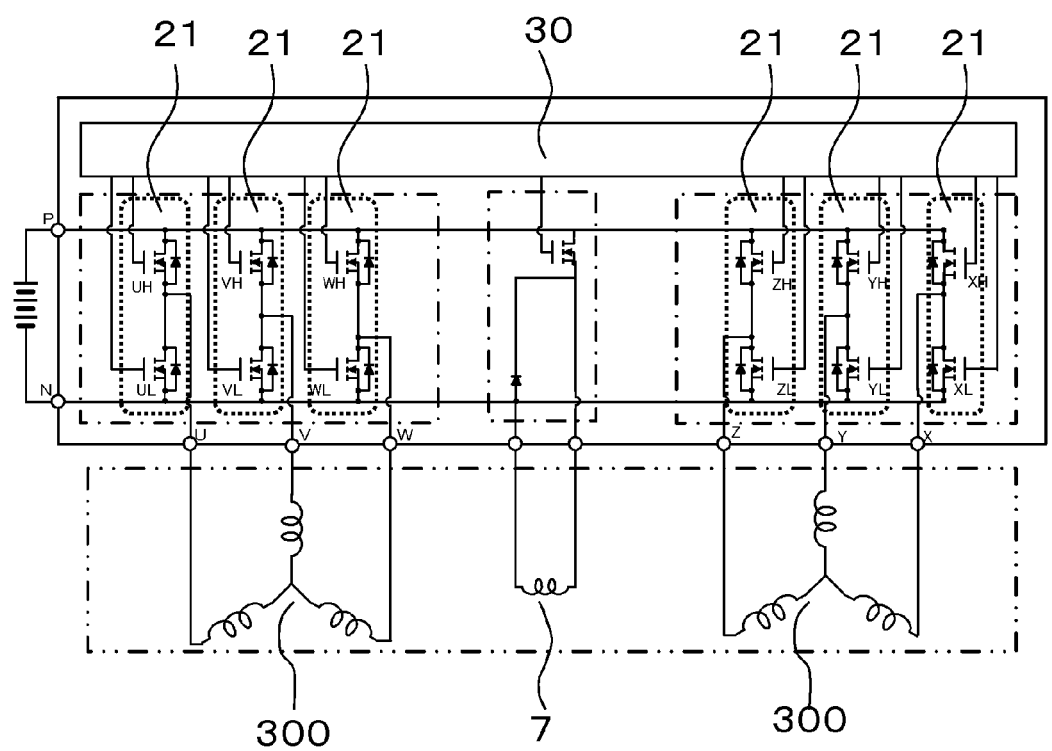
FIG. 3 is a circuit diagram of the controller-integrated rotary electric machine according to the first embodiment of the invention.

FIG. 3 is a circuit diagram of the controller-integrated rotary electric machine according to the first embodiment of the invention.

As shown in FIG. 3, in the first embodiment, each power module 21 includes two semiconductor switching devices that are connected in series and two diodes each connected in antiparallel to each corresponding semiconductor switching device, all of which are embedded in a resin and configured into one package. The two semiconductor switching devices embedded in the one power module 21 are connected in series as described above. One of the two semiconductor switching devices and the diode connected in antiparallel thereto include the positive electrode arm for one phase of the six-phase bridge circuit, while the other of the two semiconductor switching devices and the diode connected in antiparallel thereto include the negative electrode arm for the one phase. Then, the series connection point between the two semiconductor switching devices is connected to one-phase stator winding 300 of the six-phase stator winding.

Accordingly, the six power modules 21 configured as described above are connected to corresponding terminals 22a connected to a B terminal 24 described later.

Figure 2:
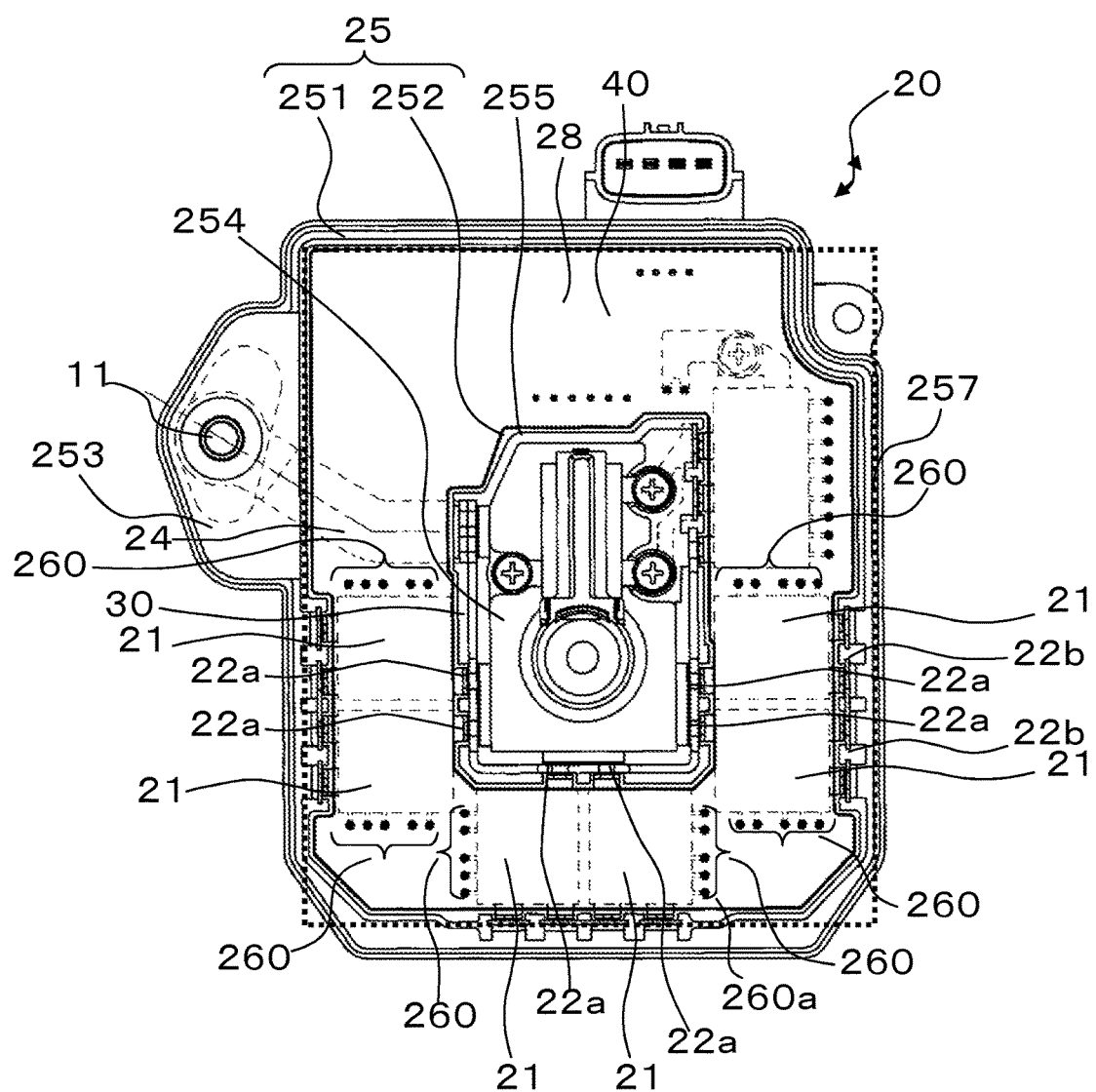
FIG. 2 is a partially cutaway side view of the rear side showing the configuration of a power circuit unit of the controller-integrated electric generator according to the first embodiment of the invention.

FIG. 2 is a partially cutaway side view of the rear side showing the configuration of the power circuit unit of the controller-integrated electric generator according to the first embodiment of the invention.

In FIG. 2, the power circuit unit 20 includes: the six power modules 21 including the six-phase power conversion circuit for controlling energization of the stator windings 300; the heat sink 23 onto which the power modules 21 are mounted with an insulating layer (not shown) in between; a power input/output terminal bolt 11 electrically connected to the positive electrode of the battery; the B terminal 24 and a B bus bar 30 electrically connected to the power input/output terminal bolt 11; and a power circuit case 25.

As shown in FIG. 1, the heat sink 23 is formed of a metal material, such as aluminum die cast, and includes a through hole 231 in the center. On the front surface of the heat sink 23, a number of cooling fins 23a extending axially toward the stator side of the rotary electric machine main body 102 are integrally formed. The through hole 231 of the heat sink 23 is passed through by the rotor shaft 6.

As shown in FIG. 2, the power circuit case 25 is formed of a resin and includes an annular outer case 251 and an annular inner case 252. The inner case 252 has an inner wall 255 formed to surround its through hole 254. The inner wall 255 includes an inner wall of the power circuit case 25.

The power circuit case 25 is fixed to the rear surface of the heat sink 23. As a result, a power module container 257 surrounded by the outer case 251 and the inner case 252 of the power circuit case 25 and the rear surface of the heat sink 23 is formed.

The six power modules 21 are, as shown in FIG. 2, contained in the power module container 257 and arranged in U-shape, spaced from each other. Control circuit board couplings 260 connected to the control circuit board 40 are inserted into the power module container 257. The control circuit board couplings 260 are intended to provide a gate signal from the controller formed on the control circuit board 40 to the gate of the semiconductor switching device of the power modules 21.

The power module container 257 containing the power modules 21 and the control circuit board couplings 260 is filled with power circuit waterproof resin 28. As a result, the power modules 21 and the control circuit board couplings 260 are embedded in the power circuit waterproof resin 28 and protected from water by the power circuit waterproof resin 28.

The B terminal 24 as a terminal electrically connected to the positive electrode of the external battery is molded to the inner case 252 and a case coupling 253 in the power circuit case 25. The B terminal 24 is electrically and mechanically connected to the terminals 22a and terminals 260a of the control circuit board couplings 260 of the six power modules 21 by welding or soldering. Note that the B terminal 24 is exposed on the top surface of the case coupling 253 of the power circuit case 25.

Figure 4:
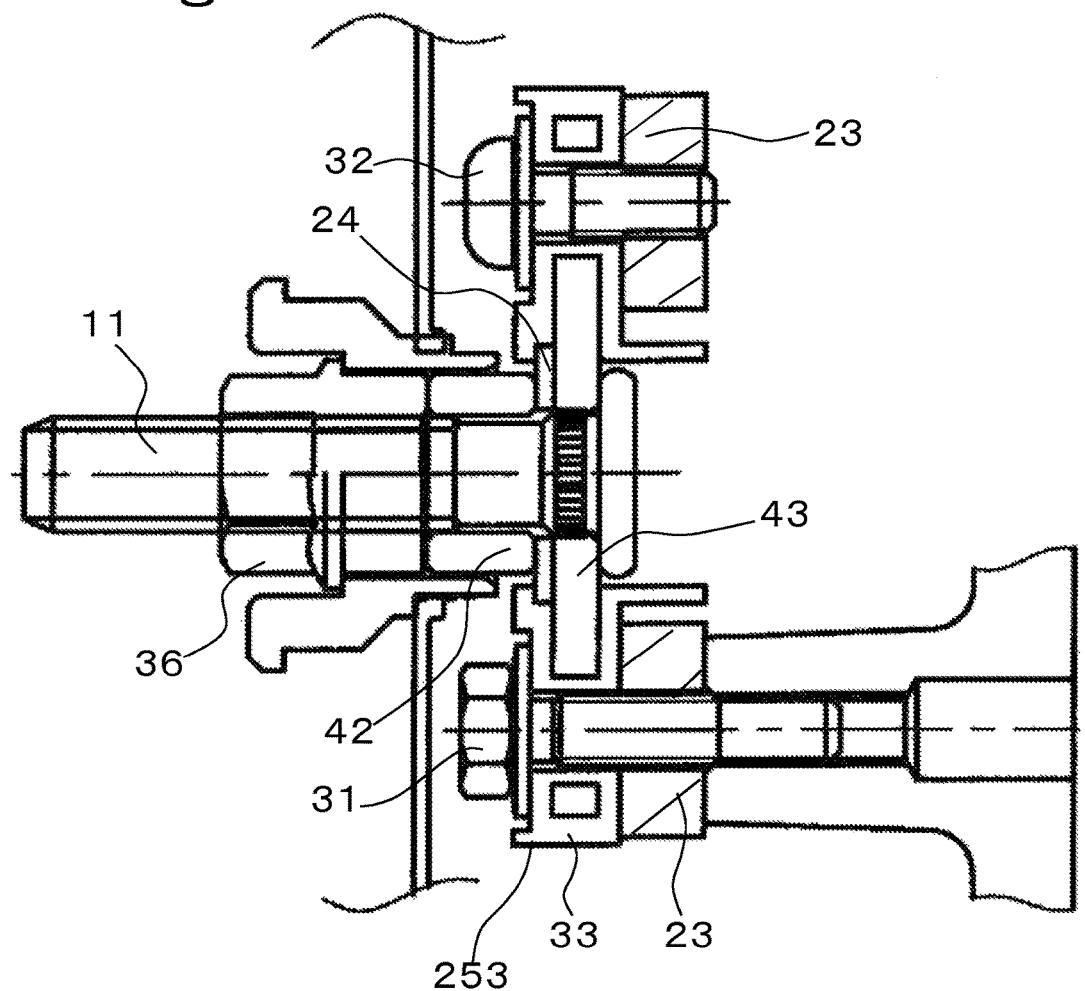
FIG. 4 is a vertical cross-sectional view showing the main part of the power circuit unit of the controller-integrated rotary electric machine according to the first embodiment of the invention.

The bus bar 30 electrically connected to the positive electrode of the external battery (hereinafter referred to as B bus bar) is fixed to the heat sink 23 with screws 31, 32 on both side of the power input/output terminal bolt 11. Note that the cross sections shown are different between FIGS. 1 and 4. In FIG. 4, the B bus bar 30 is provided on the rear side of the drawing. The B terminal 24 is placed between the power modules 21 and the heat sink 23. The B terminal 24 is formed of a metal material, such as copper.

As shown in FIG. 4, a formed female screw threadedly engages with a screw 31 inserted from the rear surface of the heat sink 23 through an insulator 33 to be fixed to the heat sink 23 with the case coupling 253 in between.

The B terminal 24 provided on the case coupling 253 of the power circuit case 25 is electrically connected to the power input/output terminal bolt 11 with a spacer 42 in between by the tightening force of a nut 36.

Specifically, as shown in FIG. 4, the power input/output terminal bolt 11 passes through the through hole provided in the B terminal 24 with the head abutting a bolt fixing member. Then, the power input/output terminal bolt 11 threadedly engages with the nut 36, is fixed to the B terminal 24 with the spacer 42 in between and is pressed into a plate 43 buried in the case coupling 253.

In the controller-integrated rotary electric machine 100 according to the first embodiment of the invention configured as above, the power input/output terminal bolt 11 is electrically connected to the positive electrode of the battery provided outside the controller-integrated rotary electric machine 100 through a battery harness or the like (not shown). Furthermore, the pulley 12 is coupled through a belt to an internal combustion engine-side pulley (not shown) provided on the output shaft of an internal combustion engine.

When the controller-integrated rotary electric machine 100 is caused to operate as a motor, the semiconductor switching devices of the power modules 21 are switching-controlled by a gate signal from the controller provided on the control circuit board 40 so as to cause the power conversion circuit including the power modules 21 to operate as an inverter.

With this control, DC power input to the terminals 22a of the power modules 21 from the battery through the power input/output terminal bolt 11, the B terminal 24 and the B bus bar 30 is converted into six-phase AC power by the inverter including the power modules 21 to be supplied to the individual phase windings of the six-phase stator winding 300 through the terminals 22b of the power modules 21. As a result, an interaction between a rotating magnetic field generated by the stator winding 300 and a magnetic field generated by the rotor winding (field winding) 7 provided on the rotor 13 drives the rotor 13 to transmit a power from the pulley 12 to the internal combustion engine through the belt.

On the other hand, when the controller-integrated rotary electric machine 100 is caused to operate as a generator, with the rotor 13 driven by a power transmitted from the internal combustion engine to the pulley 12 through the belt, the semiconductor switching devices of the power modules 21 are switching-controlled by a gate signal from the controller provided on the control circuit board 40 so as to cause the power conversion circuit including the power modules 21 to operate as a converter. As a result, AC power induced in the individual phase windings of the stator winding 300 is applied to the power modules 21 through the terminals 22b of the power modules 21 and converted into DC power by the converter including the power modules 21 to be supplied from the terminals 22a of the power modules 21 to the battery through the B bus bar 30, the terminal 24, the spacer 42 and the nut 36.

Since the controller-integrated rotary electric machine 100 according to the first embodiment of the invention is configured as described above, even when salt water penetrates from the head of the power input/output terminal bolt 11 to dissolve the plate 43 through electrolytic corrosion, the bus bar 30 has a structure unlikely to be dissolved, so power can be supplied to the power modules 21. The plate 43 is formed of a metal material, such as aluminum. When the plate (AL) is formed of a material having an ionization tendency higher than that for the bus bar (Cu) and the metal having the higher ionization tendency, such as aluminum, is caused to be in contact with the copper member, the aluminum can sacrificially become corroded to suppress corrosion on the copper bus bar. The aluminum first becomes corroded to emit electrons, thereby providing electrons to the copper, which block emission of electrons from the copper, providing an anti-corrosive effect. In addition to aluminum, iron and zinc, which are a metal having an ionization tendency higher than that of copper, may be used for the plate.

Note that according to the invention, the embodiments may be appropriately modified or omitted within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A controller-integrated rotary electric machine comprising:
   a power circuit unit provided between an external power supply and a stator winding of a rotary electric machine main body;
   a power input/output terminal bolt provided in the power circuit unit and electrically connected to the external power supply;
   a plate pressed onto the power input/output terminal bolt;
   a terminal abutting the plate, the plate being proximally closer to a head of the input/output terminal bolt than the terminal;
   a bus bar connected to the terminal;
   a power module connected to the bus bar and the stator winding;
   a heat sink having the power modules mounted thereon for cooling the power modules; and
   a case coupling of the power circuit unit fixed to the heat sink,
   wherein the power input/output terminal bolt passes through a through hole provided in the terminal,
   wherein the power input/output terminal bolt threadedly engages with a nut, is fixed to the terminal with a spacer in between and is pressed into the plate buried in the case coupling,
   wherein the power input/output terminal bolt and the bus bar are separate from each other,
   wherein the bus bar comprises a metal, and
   wherein the plate comprises a metal having an ionization tendency higher than the metal of the bus bar.

2. The controller-integrated rotary electric machine according to claim 1, wherein the power input/output terminal bolt is electrically connected to the terminal.

3. The controller-integrated rotary electric machine according to claim 1, wherein the power input/output terminal bolt is connected to the bus bar through the terminal.

4. The controller-integrated rotary electric machine according to claim 1, wherein the plate is made of a metal that is one of aluminum, iron and zinc.

5. The controller-integrated rotary electric machine according to claim 1,
   wherein the terminal is formed with the top surface of the case coupling exposed.

6. A power circuit unit configured to be provided between an external power supply and a stator winding of a rotary electric machine main body, the power circuit unit comprising:
   a power input/output terminal bolt configured to be electrically connected to the external power supply;
   a plate pressed into the power input/output terminal bolt;
   a terminal abutting the plate, the plate being proximally closer to a head of the input/output terminal bolt than the terminal;
   a bus bar connected to the terminal;
   a power module connected to the bus bar and configured to be connected to the stator winding;

a heat sink having the power module mounted thereon, the heat sink being configured to cool the power module; and a case coupling fixed to the heat sink, wherein the power input/output terminal bolt passes through a through hole provided in the terminal, wherein the power input/output terminal bolt threadedly engages with a nut, is fixed to the terminal with a spacer in between and is pressed into the plate buried in the case coupling, wherein the power input/output terminal bolt and the bus bar are separate from each other, wherein the bus bar comprises a first metal, wherein the plate comprises a second metal, and wherein the second metal has a higher ionization tendency higher than an ionization tendency of the first metal.

7. The power circuit unit according to claim 6, wherein the power input/output terminal bolt is electrically connected to the terminal.

8. The power circuit unit according to claim 6, wherein the power input/output terminal bolt is connected to the bus bar through the terminal.

9. The power circuit unit according to claim 6, wherein the plate is made of a metal that is one of aluminum, iron and zinc.

10. The power circuit unit according to claim 6, wherein the terminal is formed such that the top surface of the case coupling is exposed when the terminal is connected to the external power supply.

* * * * *